(12) United States Patent
Mundt

(10) Patent No.: US 9,573,210 B2
(45) Date of Patent: Feb. 21, 2017

(54) GEAR CUTTING MACHINE, END MILL AND METHOD OF FORM MILLING

(75) Inventor: Alois Mundt, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 842 days.

(21) Appl. No.: 13/449,158

(22) Filed: Apr. 17, 2012

(65) Prior Publication Data

US 2013/0101367 A1    Apr. 25, 2013

(30) Foreign Application Priority Data

Apr. 18, 2011    (DE) .................. 10 2011 017 411

(51) Int. Cl.
 B23F 1/06    (2006.01)
 B23C 5/10    (2006.01)
 B23F 21/12    (2006.01)

(52) U.S. Cl.
 CPC . B23F 1/06 (2013.01); B23C 5/10 (2013.01); B23F 21/12 (2013.01); B23F 21/122 (2013.01); B23C 2210/084 (2013.01); Y10T 407/1745 (2015.01); Y10T 409/10795 (2015.01); Y10T 409/103816 (2015.01); Y10T 409/103975 (2015.01); Y10T 409/108109 (2015.01); Y10T 409/108745 (2015.01)

(58) Field of Classification Search
 CPC ............. B23F 1/06; B23F 5/26; B23F 21/122; B23F 21/126; Y10T 407/1745; Y10T 409/105883; Y10T 409/107791; Y10T 409/10795; Y10T 409/108109; Y10T 409/108268; Y10T 409/108745; Y10T 409/108904

USPC ......... 409/38, 50, 51, 52, 53, 56, 57; 407/29
See application file for complete search history.

(56) References Cited

U.S. PATENT DOCUMENTS

| | | | | |
|---|---|---|---|---|
| 2,315,147 A | * | 3/1943 | Wildhaber | 409/51 |
| 2,737,855 A | * | 3/1956 | Wenz | 409/52 |
| 4,949,456 A | * | 8/1990 | Kovach | B23F 9/02 |
| | | | | 29/893.35 |
| 5,681,207 A | * | 10/1997 | Nishida et al. | 451/47 |
| 7,574,798 B2 | * | 8/2009 | Langerfeld | 29/893.35 |

FOREIGN PATENT DOCUMENTS

| | | |
|---|---|---|
| AT | 508493 A1 | 1/2011 |
| DE | 19903481 A1 | 8/2000 |
| DE | 102010061432 A1 | 6/2012 |
| RU | 2322329 C1 | 4/2008 |
| WO | WO 0139916 A1 * 6/2001 | ............... B23F 1/06 |
| WO | 2005060650 A2 | 7/2005 |
| WO | 2008133517 A1 | 11/2008 |
| WO | 2010144929 A1 | 12/2010 |

* cited by examiner

*Primary Examiner* — Sunil K Singh
*Assistant Examiner* — Michael Vitale
(74) *Attorney, Agent, or Firm* — John D. Russell

(57) ABSTRACT

The present disclosure relates to a gear cutting machine for gear cutting a workpiece, in particular a toothed wheel, by form milling having at least one cutter head for mounting at least one end mill, wherein the cutter head or the end mill and/or the workpiece mount are adjustable and the end mill axis can be aligned approximately parallel to the machined tooth flank of the clamped workpiece, and wherein the cutter axis can be applied to the flank contour and the end mill has an outer contour corresponding to the flank contour.

14 Claims, 5 Drawing Sheets

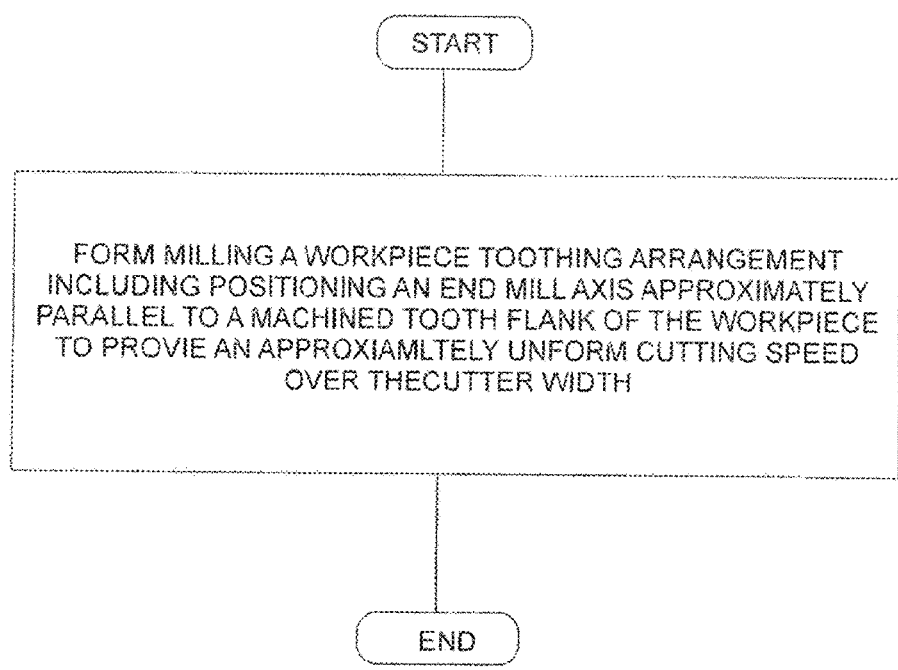

//GEAR CUTTING MACHINE, END MILL AND METHOD OF FORM MILLING

CROSS REFERENCE TO RELATED APPLICATION

This application claims priority to German Patent Application No. 10 2011 017 411.7, entitled "Gear cutting machine, end mill and method of form milling", filed Apr. 18, 2011, which is hereby incorporated by reference in its entirety for all purposes.

TECHNICAL FIELD

The present disclosure relates to a gear cutting machine for gear cutting a workpiece, in particular a toothed wheel, by form milling using an end mill.

BACKGROUND AND SUMMARY

Tooth form mills in the form of end mills are used on gear cutting machines for gear cutting toothed wheels and for milling worm gears in accordance with the forming method. The use of such end mills starts with toothed wheels at, for instance, module 10 and extends up to the largest gear cutting dimensions. When milling worm gears, these end mills are also used with a much smaller module for worm gears and worm wheels.

Tools in end mill form or, even better, side milling cutters are also used for pre-milling for large gear cutting. End mills are preferably used where other tools are excluded, e.g., for collision reasons, such as in the manufacture of closed herringbone gears, of double helical gears with a small intermediate space or of workpieces in which no suitable runover path for a disk-shaped or worm-shaped tool exists; above all with gears with a large to very large module. In addition, a mill end tool is very inexpensive in comparison with a hob in this size range. The described method is thus also interesting for large gears with smaller batch sizes.

Suitable mounts are a requirement for the use of end mills in a gear cutting machine. The gear cutting machines are equipped for this purpose with a suitable end mill head which receives the end mill and drives it for rotation about a cutter axis. In known gear cutting machines, the cutter axis of the end mill extends perpendicular to the workpiece axis of the toothed wheel to be manufactured, whereby the manufacture of true herringbone gears and double helical gears with a small or no intermediate space is made possible with the aid of the end mill.

The end mills as a rule have a conical profile, with the profile diameter tapering in the direction of the end cutters. An example for a known end mill can be seen from the two FIGS. 1 and 2.

In particular FIG. 2 schematically shows the use of the end mill 1 for manufacturing an involute toothing at the toothed wheel 2. The end mill 1 is aligned with its longitudinal axis perpendicular to the workpiece axis and rotates about its cutter axis B for the one-sided/two-sided processing of the tooth flanks. The shape of the end mill is of a conical nature, with the diameter tapering in the direction of the end cutter 3. The diameter $d_e$ of the end mill 1 in the region of the tooth head 4 is accordingly comparatively large with respect to the diameter $d_1$ in the region of the tooth base 5.

The selected profile form of the end mill 1 effects a variable cutting speed $v_c$ over the total circumference of the cutter blade. The arrows 6 identify the resulting cutting speed profile along the cutter axis B, with the cutting speed $v_{c2}$ of the highest amount being applied in the tooth head region and the minimal cutting speed $v_{c1}$ being applied in the tooth base region. The selection of an ideal cutting speed for the rotational movement is not possible due to the diameter difference. On the one hand, a specific highest speed at the cutter tip may not be exceeded; on the other hand, a specific minimum cutting speed is required.

An irregular wear or blunting of the individual cutting regions along the cutter axis B occurs as a consequence of the speed profile 6 present. This makes a frequent sharpening of the end mill blades necessary to be able to ensure a sufficient machining quality. The possible cutter service life is furthermore disadvantageously impaired by it. The cutter service life can only be extended by setting lower average cutting speeds while taking account of the blade parts with a large diameter. To avoid a partial overload of the cutter, the cutter speed accordingly has to be adapted, which can result in longer machining parts overall.

It is the object of the present disclosure to overcome the above-disclosed disadvantages in form cutting using end mills.

This object is achieved by a gear cutting machine for cutting gears into a workpiece, in particular a toothed wheel. The gear cutting machine accordingly includes at least one cutter head for receiving at least one end mill. In accordance with the present disclosure, the cutter head or the end mill and/or the workpiece mount are made adjustable, whereby the end mill axis can be aligned approximately parallel to the machined tooth flank of the clamped workpiece. The cutter axis can be placed at the flank contour, with the end mill having an outer contour corresponding to the flank contour in accordance with the present disclosure.

A largely constant cutting speed over the total tooth flank of the workpiece to be prepared can hereby be achieved. The selection of a suitable rotational speed of the end mill about its cutter axis is moreover substantially simplified by the gear cutting machine in accordance with the present disclosure since an operation of the cutter in the ideal cutting speed range is possible over the total cutting surface and individual part regions do not have to be taken into account separately. Furthermore, regular wear occurs along the total cutting surface from the tooth head up to the tooth base, which has a positive effect on the achievable cutter service lives. Viewed overall, the machining time for the workpiece can also be optimized by this approach.

The end mill can advantageously be suitable for the manufacture of toothing profiles having cyclic curves such as involute toothing or cycloid toothing and/or as Wildhaber-Novikov gears as well as, optionally profiles composed thereof. Due to the required parallelism of the cutter axis and of the cyclic curve or involute of the workpiece to be manufactured, a cross-sectional profile of the end mill is accordingly necessary having comparatively slight diameter differences along the cutter axis. As a result, an approximately constant cutting speed profile can be achieved over the total tooth flank in the manufacture of these toothing arrangements.

The gear cutting machine in accordance with the present disclosure may be designed for a one-sided tooth flank machining. The cutter axis of the end mill can in each case be set approximately parallel to the tooth flank to be machined. The alignment of the end mill takes place either by adjusting the end mill or alternatively by moving the workpiece or the machining head tangentially to the toothing arrangement. A combined adjustment possibility of the end mill, of the machining head and of the workpiece is likewise possible in one example.

Possible embodiments of the end mill are also, in addition to complete cutters made from one piece (shaft tools), assembled cutters such as disposable cutting insert cutters or cutters having exchangeable heads.

The present disclosure is furthermore directed to an end mill for the form cutting of a workpiece toothing arrangement, in particular a gear toothing or similar profiles. In accordance with the present disclosure, the end mill has an almost unchanging diameter profile in the cutter axis direction, whereby an alignment of the cutter axis approximately parallel to the tooth flank to the machined or to the corresponding tooth flank section can be ensured for workpiece machining. The specific embodiment of the cutter blade depends on the flank shape to be manufactured. For example, slight fluctuations in the diameter profile are possible in end mills for involute toothing or cycloid toothing or arc toothing. In contrast to known conical end mills, they are, however, comparatively small. Only in this way can an almost constant cutting speed profile along the cutter axis be achieved. The embodiment of the end mill in accordance with the present disclosure is equally suitable for the milling of special toothing arrangements such as assembled profiles or asymmetrical toothed arrangements. Such profiles are disclosed, for example in WO 2005/060650, to whose content reference should be made at this passage of the description.

The end mill in accordance with the present disclosure is in particular suitable for use in a gear cutting machine in accordance with one of the above-explained advantageous embodiments. The end mill accordingly has the same advantages and properties such as have already been named in the description of the gear cutting machine in accordance with the present disclosure. A repeat explanation is therefore dispensed with at this point.

The present disclosure furthermore relates to a method of form milling a workpiece toothing arrangement, in particular a gear toothing arrangement, which is carried out on a gear cutting machine using an end mill. The inventive step in the claimed method is that the mill axis is aligned approximately parallel to the machined tooth flank to achieve an approximately constant cutting speed over the total cutter width.

The procedure in accordance with the present disclosure reduces the wear phenomena at the end mill used or keeps it constant over the total blade length. The method furthermore allows a simplified selection of an ideal cutting speed for operating the end mill since the diameter differences no longer differ so much along the cutter axis. Higher cutting speed can thus be used without there being a risk of a partial overload of certain cutter regions. This results in shorter workpiece machining times.

The method in accordance with the present disclosure in particular pursues a one-sided tooth flank machining of the workpiece to be manufactured or of a part region of the workpiece tooth flank. Accordingly, the end mill is aligned again after each machined tooth flank to ensure a parallel alignment of the cutter axis for the subsequent tooth flank.

The method in accordance with the present disclosure can advantageously be carried out on a gear cutting machine. An end mill can in particular be used for this purpose.

Further advantages and details of the present disclosure will be explained in more detail with reference to an embodiment and to corresponding drawings.

BRIEF DESCRIPTION OF THE FIGURES

FIG. 6 shows a flow chart of an example method.

DETAILED DESCRIPTION

Figure 1:
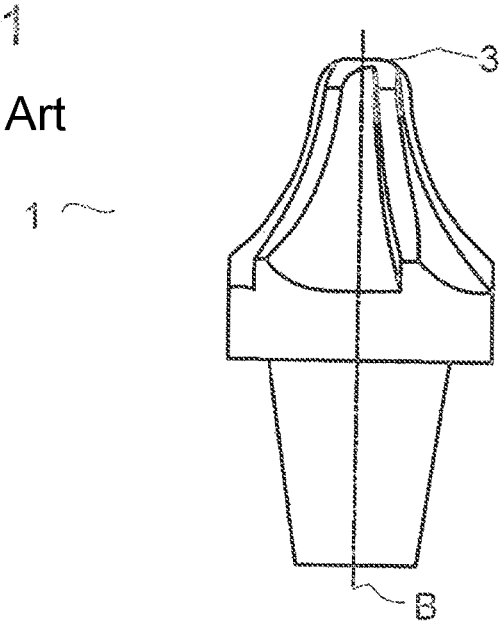
FIG. 1 shows a schematic representation of an end mill known from the prior art.
Figure 2:
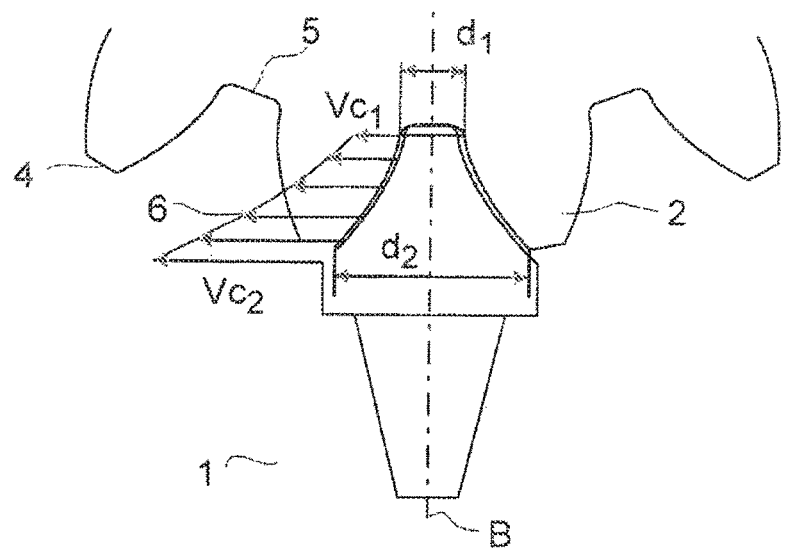
FIG. 2 shows a representation of the end mill of FIG. 1 in a machining position.

FIGS. 1 and 2 were already discussed in the introductory part of the description so that details on the shown representations will not be discussed again in this part of the description.

Figure 3:
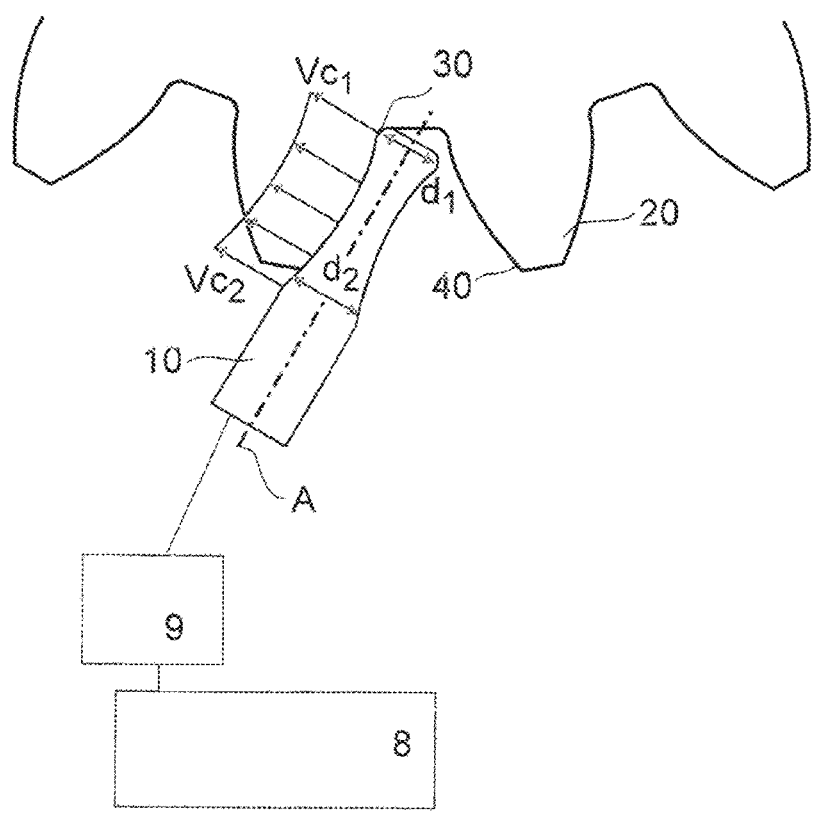
FIG. 3 shows a representation of the end mill in accordance with the present disclosure in a machining position.

FIG. 3 shows a schematic representation of the end mill 10 in accordance with the present disclosure in the gear cutting of the workpiece in the form of a toothed wheel 20 having an involute toothing. The end mill 10 is mounted at the cutter head 9 of the CNC gear cutting machine 8 in accordance with the present disclosure and is set into rotation about the cutter axis A. The resulting tool speed is designated by n and is given in revolutions per minute. The machine kinematics align the end mill 10 in accordance with the machining of the tooth flanks of the toothed wheel 20. In this respect, either the cutter or the tool mount together with the workpiece can be moved or both in combination. The gear cutting machine 8 may include one or more control units receiving information from one or more sensors in the gear cutting machine and sending control signals to one or more actuators in the gear cutting machine, including actuators coupled to the end mill 10 to rotate the engine mill and adjusting positioning of the end mill 10, such as the cutter axis A.

Figure 4:
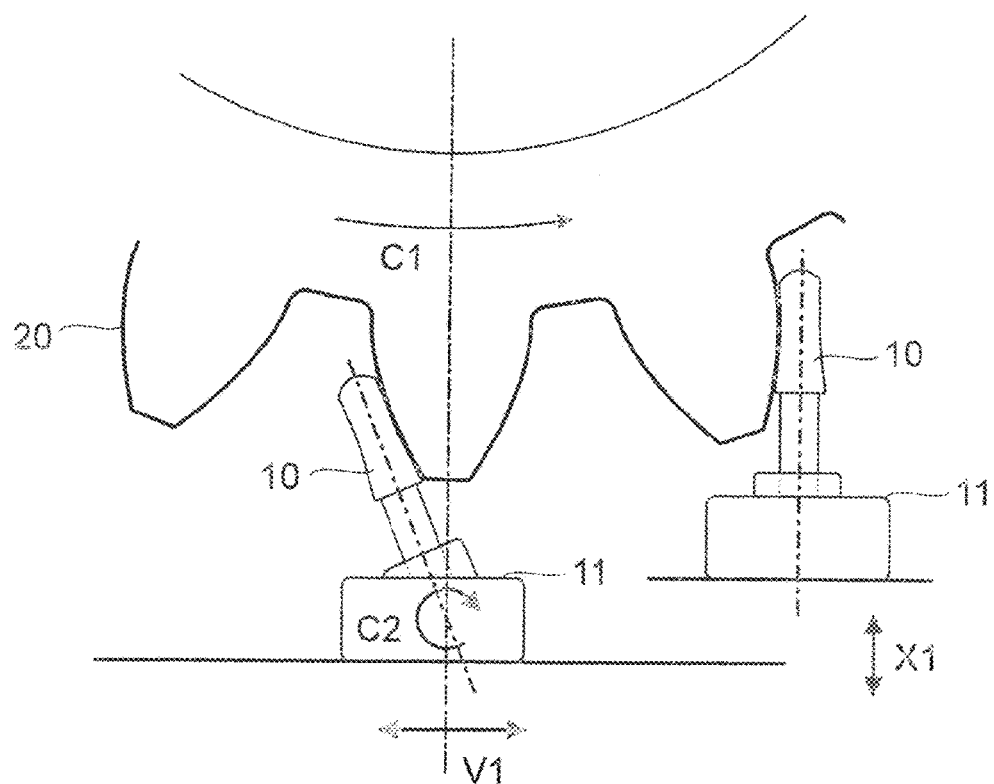
FIG. 4 shows a further representation of the machining positions of the end mill.

FIG. 4 shows the machine axes for aligning the end mill 10. The cutter 10 is either pivoted out of the center axis about the axis C2 in the cutter head 11 and is aligned almost parallel to the tooth flank of the toothed wheel 20 or it is moved laterally in the V1 direction and supplied in the X1 direction until its longitudinal axis is aligned almost parallel to the tooth flank. With helically geared workpieces or on corrections of the tooth flank over their width, the C1 axis must additionally be moved.

It can be seen in detail from FIG. 3 that the cutter axis A extends almost parallel to the involute 30 of the toothed wheel 20 to be manufactured. The innovative shape of the end mill 10, unlike the conical cutter 1 of FIGS. 1 and 2, displays a cross-sectional profile which only has slight diameter differences over the total cutter circumference from the tooth head region up to the tooth base region along the axis A.

The difference of the marked diameters $d_1$, $d_2$ is comparatively small so that consequently only slight cutting speed differences occur over the total length of the cutter blade. The cutting speed $v_{c1}$ present during the machining in the region of the tooth base is in this respect approximately equal in amount to the cutting speed $v_{c2}$ in the region of the tooth head.

Figure 5:
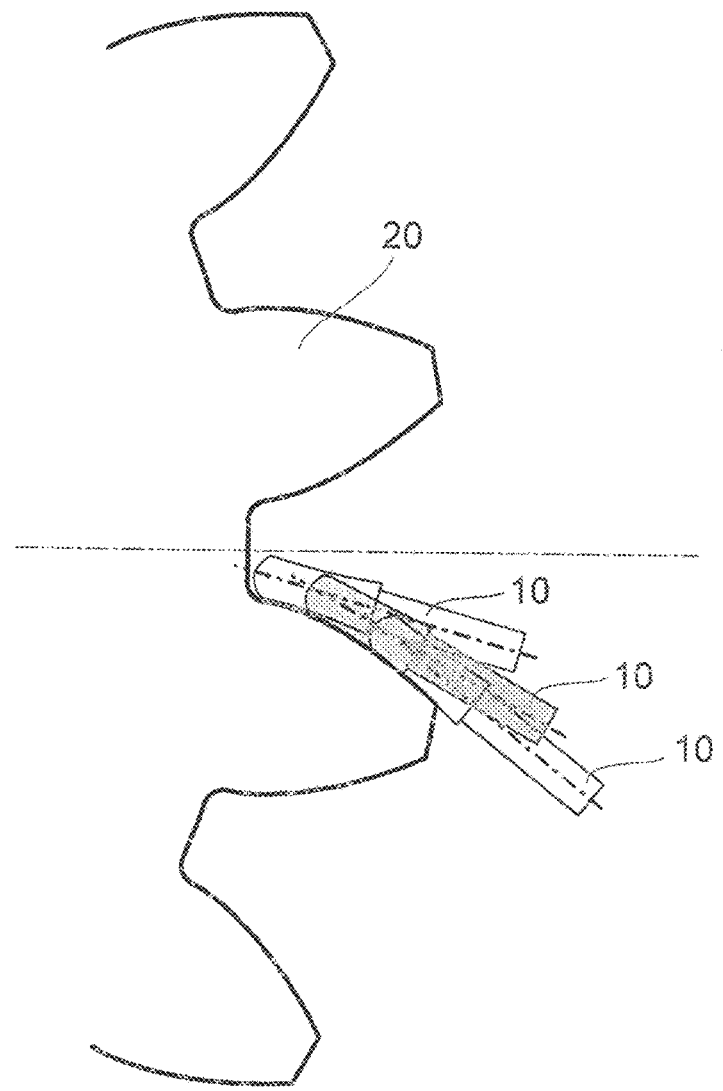
FIG. 5 shows a representation of the end mill in accordance with the present disclosure in the machining position for machining a part region of a tooth flank profile.

A partial machining of tooth flanks is also possible, as is shown in FIG. 5. Profiles having different profile shapes (see WO 2005/060650) can thus also be machined over the tooth height or also asymmetrical profiles if the cutter 10 is changed in each case between the cuts. Profile modification such as head retractions using an incorrect cutter would equally be possible. The CNC software required for this purpose is anyway necessary for this type of machining.

The calculation of the generally applicable cutting speed $v_c$ takes place using the following formula:

$$v_c = \frac{\Pi \cdot d \cdot n}{1000[\text{mm}]},$$

where d stand for the tool diameter and n for the tool speed about the cutter axis A.

After the completion of the involute tooth flank 30, the end mill 10 is aligned again by the gear cutting machine in accordance with the present disclosure so that the cutter axis A extends parallel to the remaining tooth flank 40.

It must additionally be pointed out that the end mill in accordance with the present disclosure or the gear cutting machine and the method in accordance with the present disclosure can easily be used in the gear cutting of worm gears, worm wheels, conical wheels or toothed wheel-like profiles.

In one example, a device may be provided, comprising: an end mill for gear cutting of workpieces by form milling, wherein the end mill has an almost unchanging diameter profile in the cutter axis direction along its cutter axis, whereby the cutter axis can be aligned approximately parallel, for example, within 5-10 degrees, or less, to the tooth flank for the workpiece machining. In one example, the almost unchanging diameter profile is unchanging over a majority of the end mill length, for example 90%, or may change by less than 10% from a beginning to an end of the end mill flank.

As shown in FIG. 6, a method for a gear cutting machine having an end mill, such as shown in FIGS. 3-5, is described, which may be carried out by the control unit of the gear cutting machine. In one example, at 610, the method includes form milling a workpiece, such as a toothed wheel. The milling may include extending or positioning an end mill axis approximately parallel to a machined tooth flank of the workpiece and operating the end mill with a rotational speed. The shape of the end mill and its positioning relative to the tooth flank provide an approximately uniform cutting speed over the cutter width, for example within 10% variation across the tooth flank. In one example of the method, one-sided cutting machining of the tooth flank of the workpiece takes place by the end mill where the end mill is in contact with only one tooth flank, and not an adjacent tooth flank on the other side of the end mill. The method may be implemented with a gear cutting machine with a workpiece mount clamping a workpiece, where one or more of a cutter head, the end mill, and the workpiece mount are adjusted and the end mill axis is aligned approximately parallel to a machined tooth flank of the clamped workpiece. The end mill having a cutting axis may be mounted in at least one cutter head of the machine. The method may include applying the cutter axis to a contour of the toothflank, with the end mill having an outer contour corresponding to the toothflank contour. The method may include milling one or more of an involute toothing and/or cycloid toothing and/or arc toothing and/or others into the workpiece. As noted above, the method may include positioning one or more of the cutter head, the end mill, and the workpiece mount with the end mill touching the toothed wheel on only one side to provide one-sided tooth flank machining of the workpiece in the gear cutting machine.

As noted above, in one example, the gear cutting machine's control unit is programmed with code to carry out the method of FIG. 6. In particular, the control unit may be programmed to automatically adjust the positions of the workpiece mount and/or the cutter head in order to perform the method of FIG. 6.

Further, for form milling gear wheels, the cutter axis does not cross the axis of rotation of the gear wheel, but rather is directed at a certain specified angle relative to the radial direction of the workpiece when a tooth flank is machined. This situation is particularly evident from FIG. 4. In contrast, if a gear worm is form milled, the cutter axis is directed at an angle relative to a plane that is perpendicular to the rotational axis of the gear worm.

Additionally, the method may include changing the relative direction between the cutter axis and the rotational axis of the workpiece when the gear cutting machine switches from machining a left hand tooth flank to machining a right hand tooth flank or vice versa. This is also evident from FIG. 4.

The invention claimed is:

1. A gear cutting machine for gear cutting a toothed workpiece having an involute or cycloid toothing by form milling, the gear cutting machine comprising:
at least one cutter head for mounting at least one end mill having an axis, wherein one or more of the cutter head or the end mill are adjustable and wherein the end mill axis is alignable such that it is a tangent to a machined flank of the workpiece, with an outer contour of the end mill being configured to engage an entire contour of a tooth flank of an involute or cycloid tooth from a tooth base to a tooth head, the outer contour of the end mill having an almost unchanging diameter profile in a direction of the end mill axis such that an approximately constant cutting speed is achieved over a total length of the tooth flank, and wherein the outer contour of the end mill corresponds to the tooth flank contour from the tooth base to the tooth head and is shaped for manufacturing/processing the involute or cycloid toothing.

2. The gear cutting machine in accordance with claim 1, wherein the workpiece is a toothed wheel.

3. The gear cutting machine in accordance with claim 2, wherein the one or more of the cutter head or the end mill are positionable with the end mill touching only one side of the workpiece to provide one-sided tooth flank machining of the workpiece in the gear cutting machine.

4. The gear cutting machine in accordance with claim 1, wherein the diameter profile of the end mill is almost unchanging and changes by less than 10% from a beginning of an end mill flank to an end of the end mill flank.

5. A device comprising:
an end mill for gear cutting of a toothed workpiece having an involute or cycloid toothing by form milling, wherein an outer contour of the end mill is configured to be applied to a contour of a flank of an involute or cycloid tooth of the toothed workpiece, the end mill's outer contour corresponding to the tooth flank contour from a base of the tooth to a head of the tooth, wherein an end mill axis is alignable such that the end mill's outer contour does not contact a flank of an adjacent tooth when contacting the tooth flank contour, wherein a width of a first end of the end mill's outer contour is within 10% of a width of a second end of the end mill's outer contour.

6. The device in accordance with claim 5, wherein the end mill is a shaft tool.

7. The device in accordance with claim 6, wherein a width of the end mill is almost unchanging and changes by less than 10% over a length of the end mill's outer contour.

8. The device in accordance with claim 5, wherein the outer contour of the end mill has an almost unchanging diameter profile in a direction of the end mill axis.

9. A method for a gear cutting machine having an end mill, comprising:
    form milling a toothed workpiece comprising a plurality of involute or cycloid teeth, including positioning the end mill such that an outer contour of the end mill engages a flank of an involute or cycloid tooth, and such that a cutting axis of the end mill is within 10 degrees of parallel to a line that is tangent to the tooth flank, wherein the outer contour of the end mill is shaped for manufacturing/processing the involute or cycloid teeth and corresponds to a contour of the tooth flank from a base of the tooth to a head of the tooth.

10. The method in accordance with claim 9, wherein the end mill engages only one tooth flank of the toothed workpiece at a time during form milling.

11. The method in accordance with claim 9, wherein the form milling includes form milling the toothed workpiece with the end mill.

12. The method in accordance with claim 11, further comprising positioning one or more of a cutter head or the end mill, with the end mill touching the toothed workpiece on at least one side.

13. The method in accordance with claim 9, further comprising:
    positioning the end mill such that the outer contour of the end mill engages the flank of the tooth, and such that the cutting axis of the end mill is aligned within 5 degrees of parallel to the line that is tangent to the tooth flank.

14. The method in accordance with claim 9, wherein the outer contour of the end mill has an almost unchanging diameter profile in a direction of the cutting axis of the end mill.

* * * * *